Figure 5:
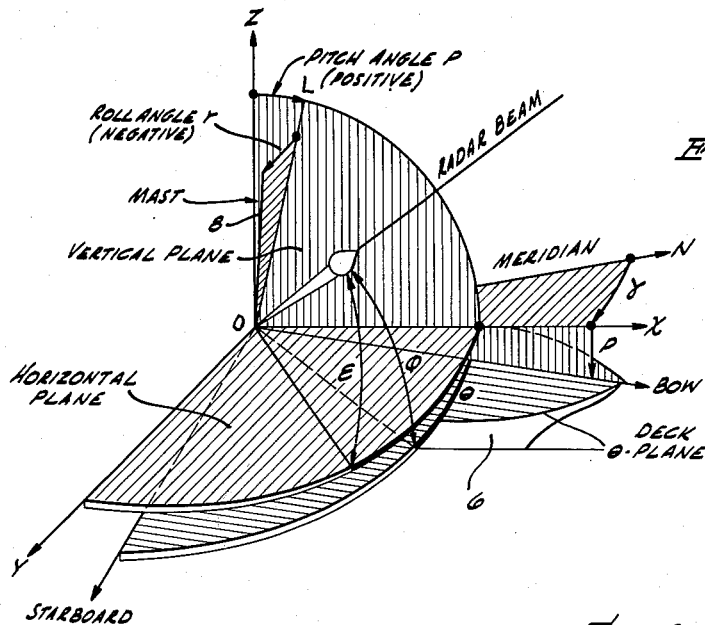

March 24, 1964     C. M. BYERLY ETAL     3,126,538
SPACE STABILIZATION COMPUTER

Filed Sept. 30, 1958     2 Sheets—Sheet 1

INVENTORS.
COY M. BYERLY,
EDWARD J. RHOAD,
By Robert H. Himes
ATTORNEY.

INVENTORS.
COY M. BYERLY,
EDWARD J. RHOAD,
BY
ATTORNEY

United States Patent Office 3,126,538
Patented Mar. 24, 1964

3,126,538
SPACE STABILIZATION COMPUTER
Coy M. Byerly, Fullerton, and Edward J. Rhoad, Anaheim, Calif., assignors to Hughes Aircraft Company, Culver City, Calif., a corporation of Delaware
Filed Sept. 30, 1958, Ser. No. 765,701
6 Claims. (Cl. 343—7)

This invention relates to apparatus for electronically space-stabilizing an electronic-scanning radar system and, more particularly, to a computer adapted to provide a horizontal space plane as a reference for the radar system without the necessity of a high-power servo system with its attendant complexities and limitations.

The deck plane of a ship, which forms the mounting base for a radar antenna, varies its attitude as the ship-pitches and rolls. Unless compensated for, these motions appear on the radar indicator and could possibly be falsely interpreted as target motion. This type of compensation, generally known as "space stabilization of the radar data" requires that the ship's deck motion, which is added into the radar data automatically by the physical motion of the antenna mount, be subtracted from the data. In order to present radar data in space-stabilized coordinates, it is necessary to provide the radar indicators with the direction cosines of the antenna beam with respect to a deflection axis which is generally normal to the deck of the ship. In a conventional radar system, this would require nothing more than an appropriate implementation of a plurality of resolvers. In the case of an electronic-scanning radar system, however, the antenna beam is moved extremely fast in one direction such as, for example, elevation whereby it becomes impractical to provide resolvers which possess a band-pass characteristic that is sufficiently broad to provide a suitable response to the resulting analogue signals.

It is therefore an object of the present invention to provide an improved apparatus for space-stabilizing a radar system.

Another object of the invention is to provide a space stabilization apparatus for a radar system which does not constitute an electro-mechanical resolver mechanization of the space stabilization relations, which mechanization would require the use of specially designed resolvers possessing bandwidth and damping characteristics suitable for passing rapidly changing direct-current step voltages.

Still another object of the invention is to provide a space stabilization apparatus which employs electro-mechanical resolvers to mechanize the slowly changing analogue signals of the space stabilization relations and then electronically combines the resulting output signals with the remaining rapidly changing signals thereby to provide analogue signals adapted to space-stabilize a radar system.

In the following description, the term "analogue signal" is defined as an electric current or voltage having a magnitude or other characteristic representative of an angle, distance, rate, velocity or other dependent or independent variable. The term "analogue quantity," on the other hand, defines a property of a physical element that is representative of a variaible to be solved. For example, the resistance of a resistor is made to be representative of a variable whereby the relationship defined by Ohm's law can be employed in conjunction with analogue signals to effect multiplication or division.

In accordance with the present invention, analogue signals representative of the more slowly varying quantities of the directional cosines employed to space-stabilize radar data are first mechanized by means of straight forward resolver techniques. In general, these slowly varying quantities are representative of the pitch, roll, course of the ship and the azimuthal direction of the antenna beam. The analogue signals resulting from the above mechanization are used to physically position the respective adjustable taps of a plurality of potentiometers thereby, in effect, providing a corresponding plurality of resistors of resistances which are representative of the analogue signals. In that the aforementioned quantities may be either positive or negative, the adjustable taps on the potentiometers are arranged so that the center position is representative of zero resistance. Multiplication of the fast changing variables with the analogue signals resulting from the above mechanization is then effected by causing currents representative of the fast changing variables to flow through the potentiometers. In that the center of each potentiometer represents zero, it is necessary that the voltages applied to the opposite extremities of the potentiometers be of equal magnitude but opposite in polarity. The output voltages appearing at the taps of the potentiometers are thus representative of the products of both the slow and fast changing analogue quantities. These output voltages are then added to provide signals representative of the direction cosines of the antenna beam.

Figure 1:
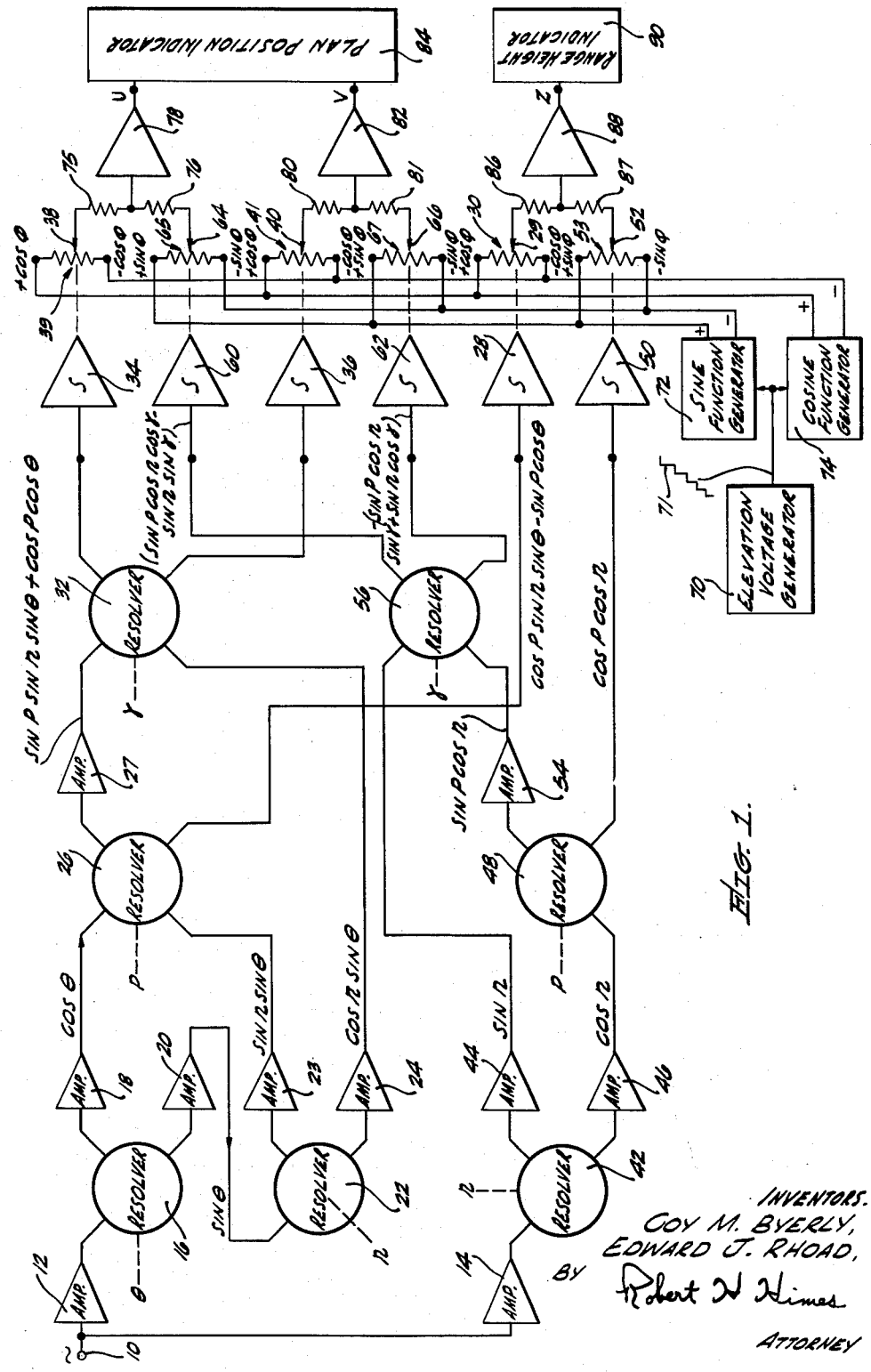

The above-mentioned and other features and objects of this invention and the manner of obtaining them will become more apparent by reference to the following description taken in conjunction with the accompanying drawings, wherein:

FIGURE 1 illustrates a schematic block diagram of the apparatus of the present invention; and FIGS. 2–5 illustrate the physical significance of the roll, pitch, course of the ship and the azimuthal direction and elevation of the antenna beam.

Figure 3:
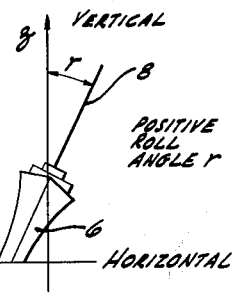
Figure 2:
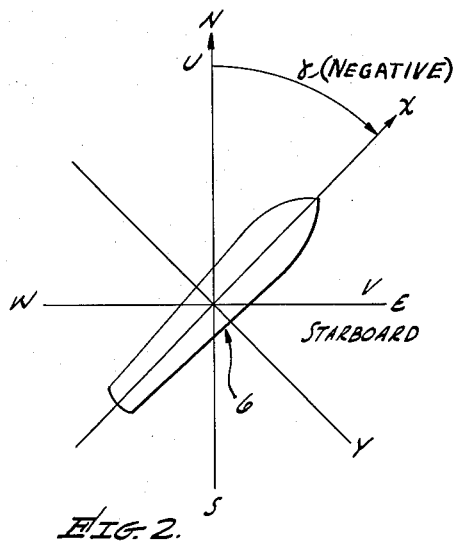

Before describing the device of the present invention, a brief explanation and description of the relationships necessary to space-stabilize a radar system will first be defined and briefly described. Referring now to FIG. 2, there is illustrated a ship 6 proceeding along a course disposed at an angle $\gamma$ which is generated clockwise from a northerly direction, N. In a relative coordinate system based on the course of the ship 6, an x-coordinate is taken along a horizontal line in a vertical plane which extends through the bow of the ship 6, as shown in FIG. 3. Distance along the x-coordinate in the direction of travel are defined as being positive. A y-coordinate, on the other hand, is also horizontal and, in addition, is transverse to the x-coordinate through the center O of the ship with the starboard direction being taken as the positive direction. Thus, the ship's course represented by the angle $\gamma$, is the angle between the x-coordinate and the northerly direction, N. This angle $\gamma$ is negative when generated in a clockwise direction from the northerly direction and positive when generated in a counterclockwise direction.

Figure 4:
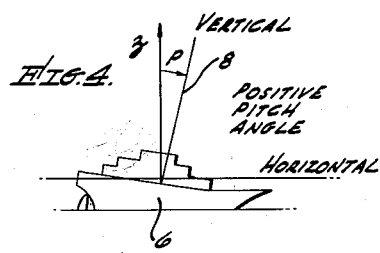

FIGS. 3 and 4 illustrate the roll and pitch attitude of the ship 6, respectively, which parameters along with the x—y coordinates are shown generally in FIG. 5. Referring to FIG. 3, the roll angle, $r$, is the angular deflection of the mast 8 mounted normal to the deck of the ship 6 on a line OL (FIG. 5) which constitutes the intersection of the vertical plane extending through the x-coordinate and a transverse plane defined by the mast 8 and a starboard coordinate from the point "O" along the deck plane of the ship 6 and, as such, normal to the x-coordinate. A roll to the port side of the ship 6 is designated as being positive and a roll to the starboard side negative. Thus, with the above definitions, the roll angle illustrated in FIG. 3 is positive, the ship 6 is viewed from the bow and that shown in FIG. 5 is negative. The pitch angle, P, on the other hand, as shown in FIG. 4 is the angle between the vertical space coordinate designated at the z-coordinate and the line OL (FIG. 5). A pitch angle generated by the bow of the ship 6 dipping below a horizontal plane is defined as a positive angle. Thus both FIGS. 4 and 5 illustrate positive pitch angles.

In the above relative $x$—$y$ coordinate system, it is evident that the direction of the radar beam may be defined by an azimuth angle in the horizontal $x$—$y$ plane and by an angle of elevation, $\epsilon$. In that the radar is an integral part of the ship 6, however, the movement of the antenna beam will be with respect to the ship 6. Thus the actual azimuthal direction of the antenna beam in the plane of the deck of the ship is designated as angle "$\theta$" and the elevation angle relative to the deck plane as "$\varphi$," as illustrated in FIG. 5. It can be shown in terms of the foregoing parameters, that direction cosines $U$, $V$ and $Z$ of the antenna beam with respect to the appropriate deflection axis of the indicators are as follows:

$$U = \sin \varphi (\sin P \cos r \cos \gamma - \sin r \sin \gamma) \quad (1)$$
$$+ \cos \varphi (\cos r \sin \theta \sin \gamma + \sin P \sin r \sin \theta \cos \gamma$$
$$+ \cos P \cos \theta \cos \gamma)$$

$$V = -\sin \varphi (\sin P \cos r \sin \gamma + \sin r \cos \gamma) \quad (2)$$
$$+ \cos \varphi (\cos r \sin \theta \cos \gamma - \sin P \sin r \sin \theta \sin \gamma$$
$$+ \cos P \cos \theta \cos \gamma)$$

$$Z = \sin \varphi (\cos P \cos r) + \cos \varphi (\cos P \sin r \quad (3)$$
$$\sin \theta - \sin P \cos \theta)$$

U and V analogue signals representative of Relations 1 and 2 above are employed to determine the direction of the range sweep of a plan-position-indicator. The Z analogue signal representative of the Relation 3 above, on the other hand, is applied to a range-height indicator in a manner to determine the vertical component of a target. It is evident that the Relations 1, 2 and 3 may assume several different forms. As shown, however, the fast changing variables, $\sin \varphi$ and $\cos \varphi$, which are trigonometric functions of the instantaneous elevation angle of the antenna beam, have been factored out. Thus, in mechanizing the Relations 1, 2 and 3 in accordance with the present invention, the slowly changing variables are first mechanized by means of conventional resolver techniques. The resulting analogue signals are then electronically combined with the fast changing variables in a manner to produce the desired Relations 1, 2 and 3. A preferred embodiment of the device of the present invention is illustrated in FIGURE 1.

Referring now to FIGURE 1, a signal of a predetermined reference frequency is applied to a terminal 10, which terminal 10 is connected to the input circuit of isolation amplifiers 12 and 14. The output signal from isolation amplifier 12 is applied to a resolver 16 along with a mechanical input representative of the azimuth angle $\theta$ of the radar antenna. The resolvers employed in this device may be of the type described on page 105 in Radiation Laboratory Series, vol. 21, entitled, "Electronic Instruments" published in New York, N.Y. in 1948. The resolver 16 generates two outputs representative of the cosine and the sine of the angle $\theta$. The signals representative of the cosine and the sine of the angle $\theta$ are passed, respectively, through isolation amplifiers 18, 20 in order to prevent undesirable loading effects on the resolver 16.

The signal representative of the $\sin \theta$ is applied to a resolver 22 which is referenced to a stable element of the ship 6 in a manner to receive a mechanical input representative of roll, $r$. The roll resolver 22 accordingly provides analogue output signals representative of ($\sin r \sin \theta$) and ($\cos r \sin \theta$), which are, in turn, passed through isolation amplifiers 23, 24, respectively, so as to avoid undesirable loading effects on the resolver 22. The analogue signal representative of ($\sin r \sin \theta$) available at the output of isolation amplifier 23 is applied together with the analogue output signal representative of $\cos \theta$ available at the output of isolation amplifier 18 to the input circuit of a resolver 26 which is referenced to a stable element on the ship 6 in a manner to receive a mechanical input representative of the pitch, P, of the ship 6. The pitch resolver 26 provides a first output signal which is representative of the $\sin P \sin r \sin \theta + \cos P \cos \theta$, which signal is passed through an isolation amplifier 27 to avoid loading the resolver 26. In addition, the pitch resolver 26 provides an analogue output representative of ($\cos P \sin r \sin \theta - \sin P \cos \theta$). This latter signal is applied to the input of a servo system 28 which positions the adjustable tap 29 of a potentiometer 30 at a distance from the midpoint of the resistance thereof that is representative of the input signal, that is, representative of the amplitude of ($\cos P \sin r \sin \theta - \sin P \cos \theta$).

The signal representative of ($\sin P \sin r \sin \theta + \cos P \cos \theta$) available at the output of isolation amplifier 27 together with the signal representative of ($\cos r \sin \theta$) available at the output of isolation amplifier 24 are applied to quadrature inputs of a resolver 32, which resolver 32 is referenced to the course of ship 6 in a manner such that it receives a mechanical input representative of the ship's course $\gamma$. The ship's course information may be readily obtained from a gyro compass of the ship 6. The resolver 32 thus provides a first analogue signal representative of ($\cos r \sin \theta \cos \gamma + \sin P \sin r \sin \theta \cos \gamma$
$+ \cos P \cos \theta \cos \gamma$)

which signal is applied to the input of a servo system 34. In addition, the resolver 32 provides an analogue output signal representative of ($\cos r \sin \theta \cos \gamma - \sin P \sin r \sin \theta \sin \gamma$
$- \cos P \cos \theta \sin \gamma$)

which signal is applied to a servo system 36. The servo systems 34, 36 are used to position adjustable taps 38, 40, respectively, of potentiometers 39, 41. The adjustable taps 38, 40 are positioned such that the resistance between the center points of the potentiometers 39, 41 and the points of contact is representative of the respective input signal.

In addition to the above, the reference signal initially applied to terminal 10 and available at the output of isolation amplifier 14 is applied to the input of a resolver 42, which resolver 42 is referenced to a stable element of the ship 6 in a manner to receive a mechanical input representative of the roll, $r$, of the ship 6. The resolver 42 thus provides outputs representative of the sine and cosine of the roll angle, $r$. These signals are isolated from resolver 42 by amplifiers 44, 46, respectively. A resolver 48 referenced to a stable element of the ship 6 in a manner to receive a mechanical input representative of the pitch, P, of the ship receives the signal available at the output of isolation amplifier 46 representative of $\cos r$ thereby to provide outputs representative of ($\cos P \cos r$) and ($\sin P \cos r$)

The output signal representative of ($\cos P \cos r$) is applied to the input of a servo system 50 which, in turn, positions the adjustable tap 52 of a potentiometer 53 in a manner such that the resistance between the midpoint thereof and the point of contact of the tap 52 is representative of the amplitude of the input signal. The remaining signal from the resolver 48 representative of ($\sin P \cos r$), on the other hand, is isolated therefrom by means of an isolating amplifier 54 and applied together with the signal representative of $\sin r$ available at the output of isolation amplifier 44 to the inputs of a resolver 56 which is referenced to the ship's compass in a manner to receive an input representative of the ship's course, $\gamma$. The resolver 56 thus receives signals representative of ($\sin P \cos r$) and $\sin r$ to provide analogue output signals representative of ($\sin P \cos r \cos \gamma - \sin r \sin \gamma$)

which output signal is applied to the input of a servo system 60 and an output signal representative of $$-(\sin P \cos r \sin \gamma + \sin r \cos \gamma)$$

which output signal is applied to the input of a servo system 62. The servo systems 60, 62 position adjustable taps 64, 66 of potentiometers 65, 67, respectively, such that the resistance from the respective center points of the potentiometers 65, 67 and the adjustable taps 64, 66 are representative of the analogue input signals to the servo systems 60, 62.

As is evident from the above, the mechanization of the direction cosine Relations 1, 2 and 3 have thus far been restricted to what has been designated as the slow-changing variables, that is, to pitch, roll, ship's course and azimuthal angle of the radar beam. In accordance with the present invention, the fast changing variable, namely, the elevation angle $\varphi$ of the radar beam, is mechanized by electronic means. More particularly, an elevation voltage generator 70 during the search mode of operation generates a "staircase" voltage 71 that is representative of the elevation of the antenna beam angle $\varphi$. The elevation voltage generator 70 may, for example, constitute an apparatus of the type described in Patent No. 2,709,770, entitled "Stepped Signal Producing System" issued to Siegfried Hansen on May 31, 1955, and assigned to the same assignee as is the present case. The staircase signal 71 thus generated by elevation voltage generator 70 is applied to both a sine function generator 72 and a cosine function generator 74. The sine function generator 72 produces two analogue signals both of which have a magnitude representative of the sine of the angle, $\varphi$, but which are of opposite polarity. The sin $\varphi$ signals generated by the sine function generator 72 are connected across the potentiometers 65, 67 and 53, the sin $\varphi$ signal having a positive polarity being uniformly connected at the top extremities of the potentiometers 65, 67 and 53, as viewed in the drawing, and the sin $\varphi$ signal having a negative polarity being connected to the remaining extremities thereof. The cosine function generator 74, on the other hand, generates analogue signals representative of positive and negative cos $\varphi$. These cos $\varphi$ signals are connected across the potentiometers 39, 41 and 30, the cos $\varphi$ signal having a polarity being connected to the top extremities, as viewed in the drawing, and the cos $\varphi$ signal having a negative polarity being connected to the remaining extremities. Thus, in each instance, a current representative of the sine of the elevation angle, $\varphi$, is made to flow through the potentiometers 65, 67 and 53, and a current representative of the cosine of the elevation angle, $\varphi$, is made to flow through potentiometers 39, 41 and 30. In that the signals applied to opposite extremities on the potentiometers 30, 39, 41, 53, 65, 67 are of equal magnitude and of opposite polarity, it is evident that the voltage with respect to ground at the midpoint of each potentiometer is always zero. Thus, it is apparent from Ohm's law (voltage=current×resistance) that the voltage appearing at the respective adjustable taps of the potentiometers represents the product of the respective analogue input signals with the cosine or sine of the elevation angle, $\varphi$. In particular, the signals available at the adjustable taps 38, 64 of the potentiometers 39, 65, respectively, are as follows:

Tap 38 of potentiometer 39:

$(\cos r \sin \theta \sin \gamma \cos \varphi + \sin P \sin r \sin \theta \cos \gamma \cos \varphi$
$\qquad + \cos P \cos \theta \cos \gamma \cos \varphi)$ (4)

Tap 64 of potentiometer 65:

$\qquad (\sin P \cos r \cos \gamma \sin \varphi - \sin r \sin \gamma \sin \varphi)$ (5)

The above signals (4), (5) are applied through resistors 75, 76, respectively, to the input of amplifier 78 to effect an addition thereby to produce the direction cosine U.

The analogue signal available at taps 40, 66 of potentiometers 41, 67, respectively, are as follows:

Tap 40 of potentiometer 41:

$(\cos r \sin \theta \cos \gamma \cos \varphi - \sin P \sin r \sin \theta \sin \gamma \cos \varphi$
$\qquad -\cos P \cos \theta \sin \gamma \cos \varphi)$ (6)

Tap 66 of potentiometer 67:

$\qquad -(\sin P \cos r \sin \gamma \sin \varphi + \sin r \cos \gamma \sin \varphi)$ (7)

The aforementioned signals (6), (7) available at taps 40, 66 are applied through resistors 80, 21, respectively, to an amplifier 82 to effect an addition thereof thereby to provide the direction cosine V. The direction cosines U and V available at the outputs of amplifiers 78, 82, respectively, are applied to a plan-position-indicator 84 to control the direction of the range sweep on the visual presentation.

The signals available at taps 29, 52 of potentiometers 30, 53, respectively, are as follows:

Tap 29 of potentiometer 30:

$\cos P \sin r \sin \theta \cos \varphi - \sin P \cos \theta \cos \varphi$ (8)

Tap 52 of potentiometer 53:

$\qquad \cos P \cos r \sin \varphi$ (9)

The above signals (8), (9), available at taps 29, 52 of potentiometers 30, 53, respectively, are applied through resistors 86, 87 to an amplifier 88 to effect an addition thereof, thereby to produce the direction cosine Z. This latter analogue signal representative of the direction cosine Z available at the output of amplifier 88 is applied to a range-height-indicator 90 in a manner to control the extent of the vertical excursion of the range sweep of its presentation thereby to determine the height of target echoes viewed thereon.

What is claimed is:

1. Apparatus adapted to provide a space-stabilized presentation of data obtained from a radar system mounted on a ship, said apparatus comprising means responsive to analogue signals representative of slowly changing variables defined as the azimuth angle, $\theta$, of the antenna beam of the radar system and the pitch, P, roll, $r$, and course, $\gamma$, of the ship for generating analogue quantities representative of $(\cos r \sin \theta \sin \gamma + \sin P \sin r \sin \theta \cos \gamma$
$\qquad + \cos P \cos \theta \cos \gamma)$ $(\sin P \cos r \cos \gamma - \sin r \sin \gamma)$ $(\cos r \sin \theta \cos \gamma - \sin P \sin r \sin \theta \sin \gamma$
$\qquad -\cos P \cos \theta \sin \gamma)$ $-(\sin P \cos r \sin \gamma + \sin r \cos \gamma)$ $(\cos P \sin r \sin \theta - \sin P \cos \theta)$ and $(\cos P \cos r)$ electronic multiplication and adding means responsive to said analogue quantities and to a signal representative of the instantaneous elevation of the antenna beam of said radar system for producing first, second and third signals representative of the space stabilization relations of said data obtained from said radar system; a first indicator responsive to said first and second signals for providing a space-stabilized plan-position presentation of said data; and a second indicator responsive to said third signal for providing a space-stabilized range-height presentation of said data.

2. In a radar system adapted to be mounted on a ship, said ship having means for providing analogue signals $r$, P and $\gamma$ representative, respectively, of the roll, pitch and course angles thereof, and said radar system providing analogue signals representative, respectively, of the azimuth angle, $\theta$, and elevation angle, $\varphi$, of its antenna beam, an apparatus for space stabilizing the data obtained by said radar system comprising: means responsive to said analogue signals representative of $r$, P, $\gamma$ and $\theta$ for producing analogue quantities representative of $(\cos P \sin r \sin \theta - \sin P \cos \theta)$ and $(\cos P \cos r)$ electronic multiplication and adding means responsive to said analogue quantities and to said analogue signal representative of angle, $\varphi$, for producing an analogue output signal representative of the direction cosine of said data with respect to the vertical; and an indicator responsive to said analogue output signal for providing a space-stabilized range-height presentation of said data.

3. Apparatus adapted to provide a space-stabilized plan-position presentation of data obtained from a radar system mounted on board a ship, said apparatus comprising: means responsive to signals representative of slow-changing variables defined as the azimuth angle, $\theta$, of the antenna beam of the radar system, and the pitch angle, P, roll angle, $r$, and course, $\gamma$, of the ship for producing first, second, third and fourth analogue signals representative, respectively, of $(\cos r \sin \theta \sin \gamma + \sin P \sin r \sin \theta \cos \gamma$ $+ \cos P \cos \theta \cos \gamma)$ $(\sin P \cos r \cos \gamma - \sin r \sin \gamma)$ $(\cos r \sin \theta \cos \gamma - \sin P \sin r \sin \theta \sin \gamma$ $- \cos P \cos \theta \sin \gamma)$ and $-(\sin P \cos r \sin \gamma + \sin r \cos \gamma)$ first, second, third and fourth potentiometers having first, second, third and fourth adjustable taps, respectively; means including first, second, third and fourth servo systems connected to said first, second, third and fourth adjustable taps of said potentiometers, respectively, and responsive to said first, second, third and fourth analogue signals for adjusting the resistance between the respective mid-centers of said potentiometers and the respective points of contact of said adjustable taps to be representative of said first, second, third and fourth analogue signals, respectively; a sine function generator responsive to an analogue signal representative of the instantaneous elevation of the antenna beam of said radar system for producing fifth and sixth analogue signals, each having a magnitude indicative of the sine of said elevation angle and being opposite in polarity, said fifth and sixth signals being applied across said second and fourth potentiometers; a cosine function generator responsive to said analogue signal representative of the instantaneous elevation of the antenna beam of said radar system for producing seventh and eighth analogue signals, each having a magnitude indicative of the cosine of said elevation angle and being opposite in polarity; means coupled to the adjustable taps of said first and second potentiometers for adding the voltages appearing thereat thereby to produce a ninth signal representative of a first direction cosine; means responsive to the voltages appearing on the adjustable taps of said third and fourth potentiometers for adding the voltages appearing thereat thereby to produce a tenth signal representative of a second direction cosine; and means for applying said ninth and tenth signals representative, respectively, of said first and second direction cosines to a plan-position-indicator thereby to determine the direction of the range sweep of said indicator.

4. Apparatus adapted to provide a space-stabilized range-height presentation of data obtained from a radar system mounted on board a ship and having means for generating an analogue signal representative of the instantaneous elevation of the antenna beam thereof, said apparatus comprising means responsive to signals representative of slow-changing variables defined as the azimuth angle, $\theta$, of the antenna beam of the radar system, and the pitch angle, P, roll angle, $r$, and course, $\gamma$, of the ship for producing first and second analogue signals representative, respectively, of $(\cos P \sin r \sin \theta - \sin P \cos \theta)$ and $(\cos P \cos r)$; first and second servo systems including first and second potentiometers and responsive to said first and second analogue signals, respectively, for positioning the adjustable taps of said potentiometers, thereby to adjust the resistance between the respective mid-centers thereof and the points of contact of said taps to be representative of the respective analogue signals; a sine function generator responsive to said analogue signal representative of said instantaneous elevation of the antenna beam for producing third and fourth analogue signals each having a magnitude indicative of the sine of said elevation angle and being opposite in polarity, said third and fourth signals being applied across said second potentiometer; a cosine function generator responsive to said analogue signal representative of the instantaneous elevation of the antenna beam of said radar system for producing fifth and sixth analogue signals each having a magnitude indicative of the cosine of said elevation angle and being opposite in polarity; means coupled to the adjustable taps of said first and second potentiometers for adding the voltages appearing thereat, thereby to produce a seventh signal representative of a direction cosine of the data provided by said radar system; and means for applying said seventh signal representative of said direction cosine to a range-height indicator thereby to determine the vertical component of the range sweep of said indicator.

5. In a radar system adapted to be mounted on an object having varying pitch, course and roll represented, respectively, by angles, P, $\gamma$ and $r$, said radar system providing first and second analogue signals representative, respectively, of the azimuth angle, $\theta$, and elevation angle $\varphi$, of its antenna beam, an apparatus for space-stabilizing the data obtained by said radar system comprising:

(a) means responsive to said first analogue signal and referenced to said object for generating a third analogue signal that is a function of $(\cos r \sin \theta \sin \gamma)$, $(\sin P \sin r \sin \theta \cos \gamma)$ and $(\cos P \cos \theta \cos \gamma)$; a fourth analogue signal that is a function of $(\sin P \cos r \cos \gamma)$ and $(\sin r \sin \gamma)$; a fifth analogue signal that is a function of $(\cos r \sin \theta \cos \gamma)$, $(\sin P \sin r \sin \theta \sin \gamma)$ and $(\cos P \cos \theta \sin \gamma)$; and a sixth analogue signal that is a function of $(\sin P \cos r \sin \gamma)$ and $(\sin r \cos \gamma)$;

(b) first electronic multiplication and adding means responsive to said second, third and fourth analogue signals for producing a first output signal representative of a first direction cosine of said data obtained by said radar system; and (c) second electronic multiplication and adding means responsive to said second, fifth and sixth analogue signals for producing a second output signal representative of a second direction cosine of said data obtained by said radar system.

6. In a radar system adapted to be mounted on an object having varying pitch, course and roll represented, respectively, by angles P, $\gamma$ and $r$, said radar system providing first and second analogue signals representative, respectively, of the azimuth angle, $\theta$, and elevation angle, $\varphi$, of its antenna beam, an apparatus for space-stabilizing the data obtained by said radar system comprising:

(a) means responsive to said first analogue signal and referenced to said object for generating a third analogue signal that is a linear function of $(\cos r \sin \theta \sin \gamma)$, $(\sin P \sin r \sin \theta \cos \gamma)$ and $(\cos P \cos \theta \cos \gamma)$; a fourth analogue signal that is a linear function of $(\sin P \cos r \cos \gamma)$ and $(\sin r \sin \gamma)$; a fifth analogue signal that is a linear function of $(\cos r \sin \theta \cos \gamma)$, $(\sin P \sin r \sin \theta \sin \gamma)$ and $(\cos P \cos \theta \sin \gamma)$; and a sixth analogue signal that is a linear function of $(\sin P \cos r \sin \gamma)$ and $(\sin r \cos \gamma)$;

(b) first, second, third and fourth servo systems responsive, respectively, to said third, fourth, fifth and sixth analogue signals for converting said third, fourth, fifth and sixth analogue signals into first, second, third and fourth analogue quantities, respectively;

(c) electronic multiplication and adding means responsive to said first and second analogue quantities and said second analogue signal for producing a first output signal representative of a first direction cosine in the horizontal plane of said data obtained by said radar system; and (d) second electronic multiplication and adding means responsive to said third and fourth analogue quantities and said second analogue signal for producing a second output signal representative of the second direction cosine in said horizontal plane of said data obtained by said radar system.

References Cited in the file of this patent

UNITED STATES PATENTS

| | | |
|---|---|---|
| 2,480,201 | Alvarez | Aug. 30, 1949 |
| 2,728,075 | Sunstein | Dec. 20, 1955 |

UNITED STATES PATENT OFFICE
CERTIFICATE OF CORRECTION

Patent No. 3,126,538                    March 24, 1964

Coy M. Byerly et al.

It is hereby certified that error appears in the above numbered patent requiring correction and that the said Letters Patent should read as corrected below.

Column 2, line 44, for "Distance" read -- Distances --; column 3, line 24, for "+cos P cos θ cos γ" read -- -cos P cos θ sin γ --; column 4, line 26, for "cos", second occurrence, read -- sin --; line 30, for "prevides" read -- provides --; line 43, for "aavilable" read -- available --; column 6, line 8, for "cos sin φ" read -- sin φ --.

Signed and sealed this 22nd day of September 1964.

(SEAL)
Attest:

ERNEST W. SWIDER                         EDWARD J. BRENNER
Attesting Officer                          Commissioner of Patents